(12) United States Patent
Jin et al.

(10) Patent No.: US 10,173,610 B2
(45) Date of Patent: Jan. 8, 2019

(54) VEHICLE IDENTIFICATION NUMBER CARPET COVER

(71) Applicant: FORD GLOBAL TECHNOLOGIES, LLC, Dearborn, MI (US)

(72) Inventors: Xue Zhi Jin, Nanjing (CN); Jonas Liu, Nanjing (CN); Wei Xu, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 142 days.

(21) Appl. No.: 15/212,339

(22) Filed: Jul. 18, 2016

(65) Prior Publication Data

US 2018/0001841 A1    Jan. 4, 2018

(30) Foreign Application Priority Data

Jun. 30, 2016    (CN) .......................... 2016 1 0509591

(51) Int. Cl.
*B60R 13/10* (2006.01)
*B60R 13/02* (2006.01)
*B60N 3/04* (2006.01)

(52) U.S. Cl.
CPC .......... *B60R 13/0275* (2013.01); *B60N 3/042* (2013.01); *B60R 2013/0287* (2013.01)

(58) Field of Classification Search
CPC ........................... B60N 3/042; B60R 13/0275
USPC ...................................................... 296/97.23
See application file for complete search history.

(56) References Cited

U.S. PATENT DOCUMENTS

| | | | | |
|---|---|---|---|---|
| 5,358,291 A | * | 10/1994 | Malmanger | B63B 19/16 292/175 |
| 5,502,930 A | * | 4/1996 | Burkette | E04L 32/7429 16/225 |
| 8,167,352 B2 | * | 5/2012 | Nakamura | B60N 3/046 160/404 |
| 8,727,411 B2 | | 5/2014 | Myszkowski | |

FOREIGN PATENT DOCUMENTS

| | | |
|---|---|---|
| CN | 201633593 U | 11/2010 |
| CN | 204367955 U | 6/2015 |
| DE | 102013014123 A1 | 3/2014 |

OTHER PUBLICATIONS

English Machine Translation of CN201633593U.
English Machine Translation of CN204367955U.
English Machine Translation of DE102013014123A1.

* cited by examiner

*Primary Examiner* — Pinel E Romain
(74) *Attorney, Agent, or Firm* — Vichit Chea; King & Schickli, PLLC

(57) ABSTRACT

A carpet cover is provided for a vehicle identification number. That carpet cover includes a first layer of material having a first window and a first flap closing the first window as well as a second layer of material having a second window and a second flap closing the second window. This second window overlies and overlaps the first window and the second flap overlies and overlaps the first flap.

18 Claims, 4 Drawing Sheets

VEHICLE IDENTIFICATION NUMBER CARPET COVER

TECHNICAL FIELD

This document relates generally to the motor vehicle equipment field and, more particularly, to a carpet cover for a vehicle identification number that is provided on the floor pan of the motor vehicle.

BACKGROUND

A vehicle identification number or VIN is provided on the floor pan of a motor vehicle. Typically, the floor pan is covered by at least two layers of material including a sound insulating layer and a carpet layer. Accordingly, some accommodation must be made in order to allow one to view the VIN number on the floor pan.

Toward this end, it has been known in the past to make a single aligned cut through both the carpet and insulation layers in order to form a flap that may be opened to view the VIN number. Since the single cut runs straight through the carpet and insulation layers to the floor pan, there is a risk that the sheet metal will be visible through the cutting gap providing an aesthetically displeasing appearance. Further, such a solution does not include any type of finger access in order to allow the flap to be easily opened.

In accordance with yet another prior art solution to the problem, an opening is cut in the carpet and insulation layers over the VIN number and a clear plastic cover is assembled into that opening. Unfortunately, such an approach requires additional tooling and manufacturing costs associated with the manufacturer of the clear plastic cover or window and the assembly of that structure into the opening in the carpet and insulation layers.

This document relates to a new and improved carpet cover for a VIN that allows one to quickly and easily view the VIN number on the floor pan when desired while also advantageously providing a more aesthetically pleasing appearance at a nominal manufacturing cost.

SUMMARY

In accordance with the purposes and benefits described herein, a carpet cover is provided for a VIN. That carpet cover comprises a first flap and a second flap overlapping the first flap.

More specifically, the first flap may define a first perimeter P1 and the second flap may define a second perimeter P2 where P2>P1. Further, the first flap may be connected by a first living hinge to a first layer of material. Similarly, the second flap may be connected by a second living hinge to a second layer of material. The second layer of material overlies the first layer of material.

Still further, the first layer may include a first window overlying the VIN and the second layer may include a second window overlying the first window and the VIN. Still further, the first layer may include a margin extending around the first window and the second flap may include a portion that rests on that margin when the first flap and the second flap close the first window and the second window overlying the VIN.

In one possible embodiment, the first layer is made from an insulation material and the second layer is made from a carpet material.

Described in other terms, the carpet cover for a VIN may comprise a first layer of material including a first window and a first flap closing the first window as well as a second layer of material including a second window and a second flap closing the second window. The second window overlies and overlaps the first window.

Still further, the first layer of material may include a margin around the first window. Further, the second flap may include a portion resting upon the margin when the first flap is closing the first window and the second flap is closing the second window.

In addition, the first flap may include a first living hinge about which the first flap pivots between an opened position and a closed position. Similarly, the second flap may include a second living hinge about which the second flap pivots between the opened position and the closed position.

Still further, the first flap may be connected to the second flap and the first and second flaps may be opened and closed together. In addition, the second layer may include a finger access opening adjacent the second flap opposite the second hinge. The second flap may also include an exposed edge at the finger access opening whereby the second flap may be engaged and the first and second flaps may be displaced from the closed position into the opened position in order to view the VIN. In such embodiments, the margin closes the bottom of the finger access opening in order to prevent one from viewing the sheet metal of the floor pan.

In one possible embodiment of the carpet cover, the first layer of material may be an insulating material while the second layer of material may be a carpet.

In the following description, there are shown and described several preferred embodiments of the carpet cover. As it should be realized, the carpet cover is capable of other, different embodiments and its several details are capable of modification in various, obvious aspects all without departing from the carpet cover as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the carpet cover and together with the description serve to explain certain principles thereof. In the drawing figures.

Figure 1:
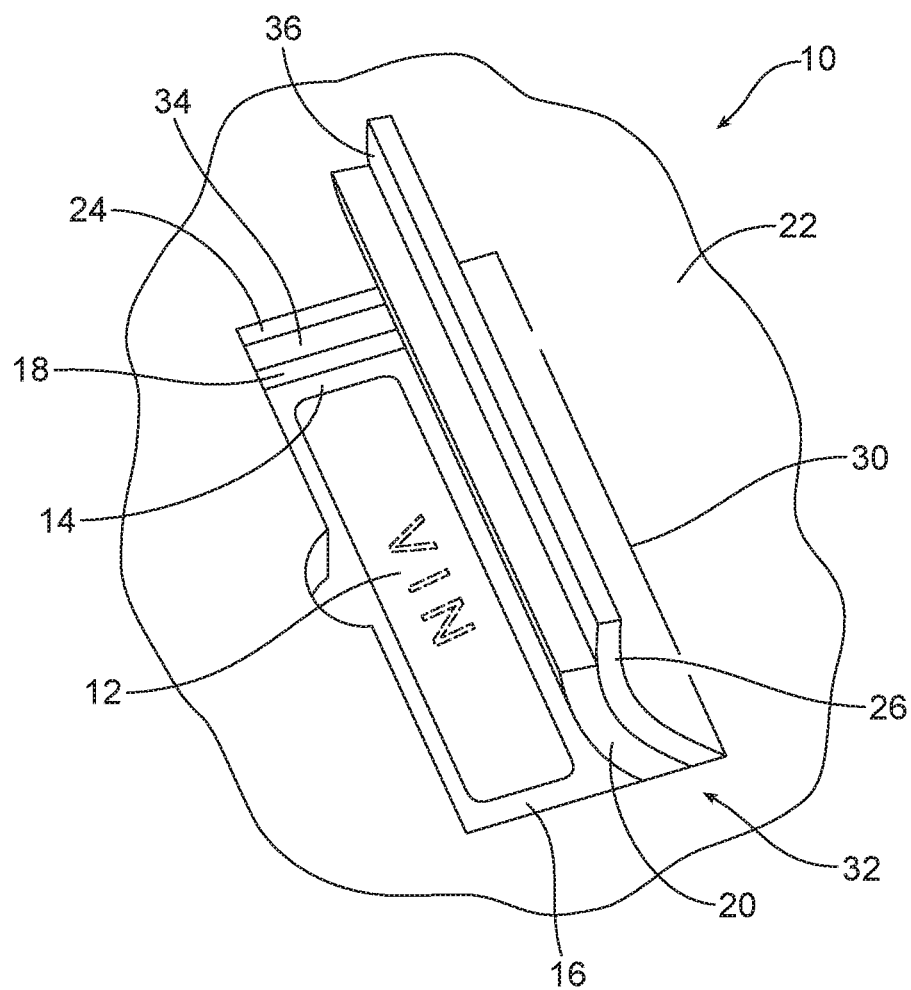
FIG. 1 is a top perspective view of the carpet cover illustrated in the open position whereby one may view and read the VIN number provided on the floor pan of the motor vehicle.

Reference will now be made in detail to the present preferred embodiments of the carpet cover, examples of which are illustrated in the accompanying drawing figures.

DETAILED DESCRIPTION

Reference is now made to FIGS. 1-5 illustrating the carpet cover 10 that is provided for selectively exposing or concealing the VIN 12 that is provided on the floor pan 14 of the motor vehicle.

As illustrated, the carpet cover 10 includes a first layer of material 16 including a first window 18 and a first integral flap 20 for closing the first window. In addition, the carpet cover 10 includes a second layer of material 22 including a second window 24 and a second flap 26 for closing the second window. As should be appreciated, the first window 18 and first flap 20 define or include a first perimeter P1 while the second window 24 and second flap 26 define or include a second perimeter P2 where P2>P1.

Figure 2:
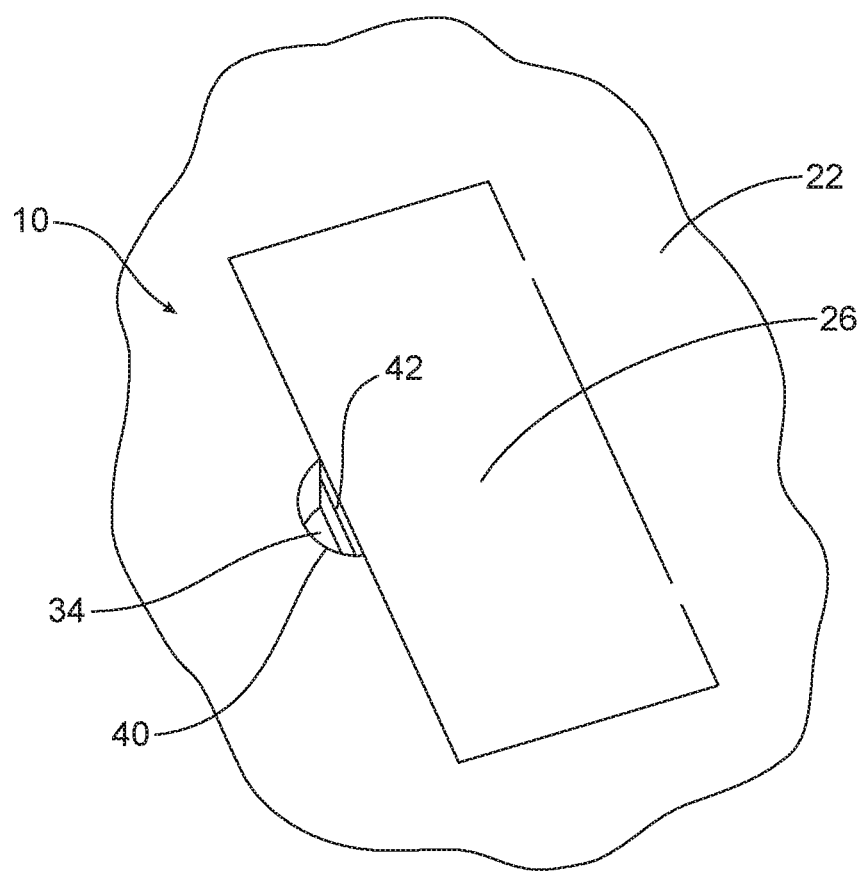
FIG. 2 is a view similar to FIG. 1 but showing the first and second flaps of the carpet cover in the closed position so as to conceal the VIN number and provide an aesthetically pleasing appearance.
Figure 3:
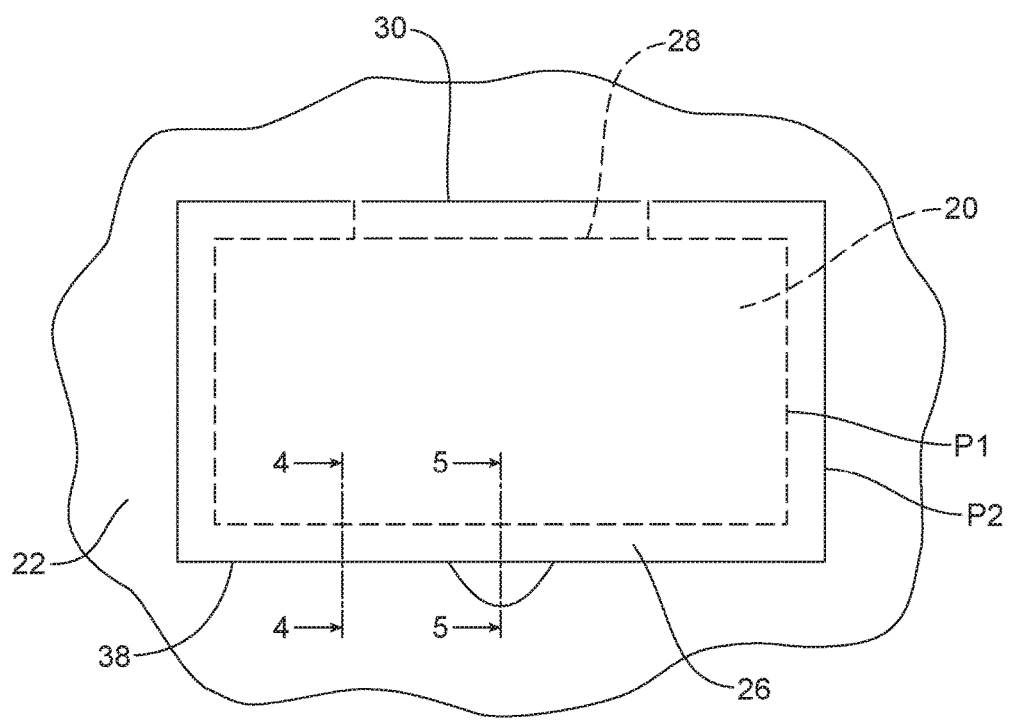
FIG. 3 is a schematic top plan view of the carpet cover illustrating the flap in the closed position.
Figure 4:
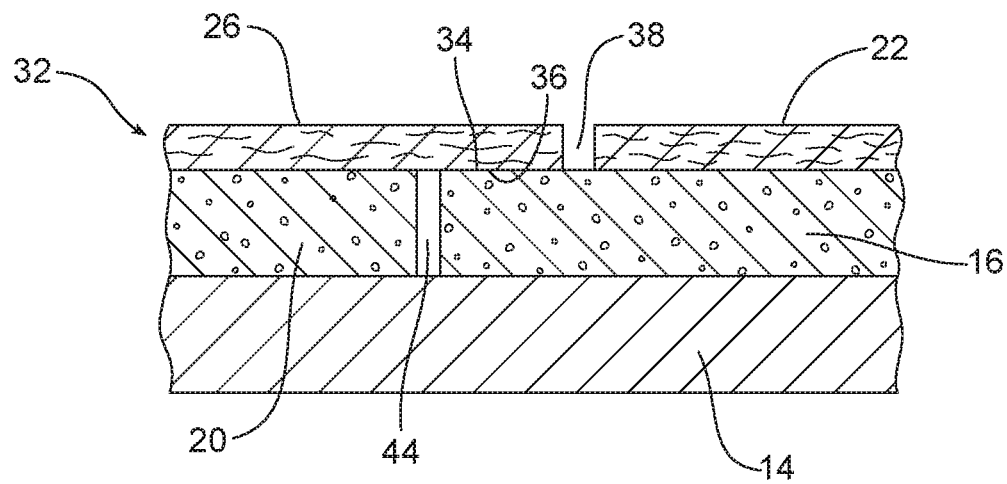
FIG. 4 is a cross-sectional view of the flap assembly taken along line 4-4 of FIG. 3.

As should be further appreciated, the first flap 20 includes a first living hinge 28 about which the first flap 20 is pivoted between the opened position illustrated in FIG. 1 and the closed position illustrated in FIG. 2. Similarly, the second flap 26 includes a second living hinge 30 about which the second flap is pivoted between the opened position illustrated in FIG. 1 and the closed position illustrated in FIG. 2.

In the illustrated embodiment, the first flap 20 and the second flap 26 are connected together by adhesive, stitching and/or other appropriate means so as to form a flap assembly 32. When the flap assembly 32 is fully opened as illustrated in FIG. 1, one may easily view the VIN 12 through the first and second windows 18, 24. In contrast, when the flap assembly is closed as illustrated in FIG. 2, both the VIN 12 and the floor pan 14 are completely concealed from view in an aesthetically pleasing manner.

As best illustrated in FIGS. 1 and 3-5, the second layer of material 22 overlies the first layer of material 16. In some embodiments the first layer of material 16 comprises a sound absorbing or insulating material while the second layer of material 22 comprises carpeting.

As illustrated in FIGS. 1 and 3-5, the first layer of material 16 includes a margin or shoulder 34 around the first window 18. The second flap 26 includes a portion 36 that rests upon the margin 34 when the flap assembly 32 is in the closed position and the first flap 20 is closing the first window 18 and the second flap 26 is closing the second window 24. Thus, when the flap assembly 32 is closed, the cut line 38 around the second flap 26 terminates at the margin 34 so as to prevent one from viewing the floor pan 14 through the cut line 38 and thereby providing a more aesthetically pleasing appearance.

Figure 5:
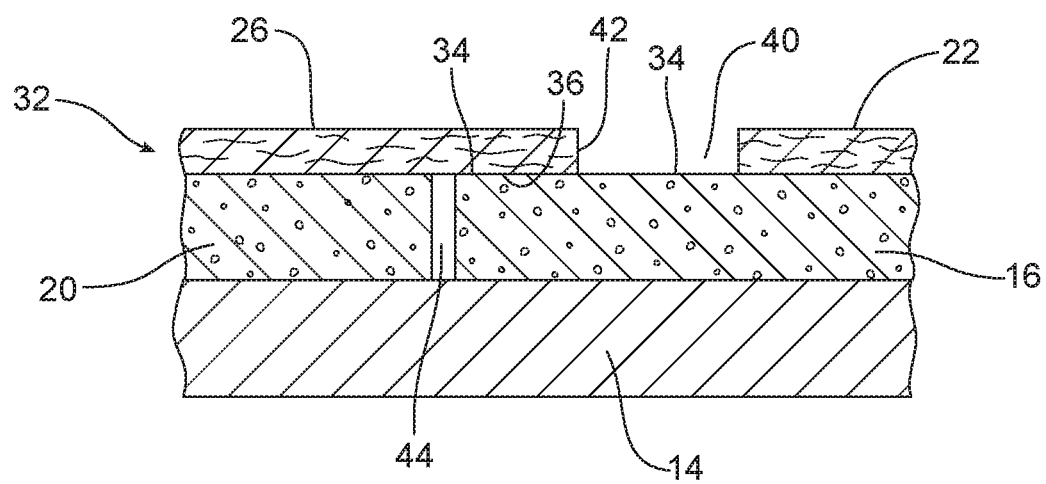
FIG. 5 is a cross-sectional view of the flap assembly taken along line 5-5 of FIG. 3.

As should be appreciated from viewing FIGS. 2 and 5, the second layer of material 22 also includes a finger access opening 40 adjacent the second flap 26 opposite the second living hinge 30. Further, the second flap 26 includes an exposed edge 42 at the finger access opening 40 whereby the second flap 26 may be engaged and the flap assembly 32 including the first and second flaps 20, 26 may be displaced into the opened position. When the flap assembly 32 is closed as illustrated in FIG. 2, it should be appreciated that the margin 34 of the first layer 16 closes the bottom of the finger access opening 40 thereby fully concealing the floor pan 14 from view.

Advantageously, the carpet cover 10 for selectively exposing or concealing the VIN 12 as desired is very easy and inexpensive to manufacture. The cut line 38 in the carpet layer 22 and the cut line 44 in the insulation layer 16 are made in opposite directions. The cutting edge used to cut the carpet layer 22 may be larger than the cutting edge used to cut the insulation layer 16. The overlap or margin 34 may be about 10 mm wide to prevent see through to the floor pan 14. Additional cutting of the carpet layer 22 may be completed to provide the finger access opening 40.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A carpet cover for a VIN, comprising:
   a floor carpet having a window;
   a first flap closing the window; and
   a second flap overlapping said first flap.

2. The carpet cover of claim 1, wherein said first flap defines a first perimeter P1 and said second flap defines a second perimeter P2 where P2>P1.

3. The carpet cover of claim 2, wherein said first flap is connected by a first living hinge to a first layer of material.

4. The carpet cover of claim 3, wherein said second flap is connected by a second living hinge to a second layer of material.

5. The carpet cover of claim 4, wherein said second layer of material overlies said first layer of material.

6. The carpet cover of claim 5, wherein said first layer includes a first window overlying said VIN and said second layer includes a second window overlying said first window and said VIN.

7. The carpet cover of claim 6, wherein said first layer includes a margin extending around said first window and said second flap includes a portion that rests on said margin when said first flap and said second flap close said first window and said second window overlying said VIN.

8. The carpet cover of claim 7, wherein said first layer of material is made from an insulation material and said second layer of material is made from a carpet material.

9. A carpet cover for a VIN, comprising:
   a first layer of material including a first window and a first flap closing said first window; and
   a second layer of material including a second window and a second flap closing said second window wherein said second window overlies and overlaps said first window.

10. The carpet cover of claim 9, wherein said first layer of material includes a margin around said first window.

11. The carpet cover of claim 10, wherein said second flap includes a portion resting upon said margin when said first flap is closing said first window and said second flap is closing said second window.

12. The carpet cover of claim 11, wherein said first flap includes a first living hinge about which said first flap pivots between an opened position and a closed position.

13. The carpet cover of claim 12, wherein said second flap includes a second living hinge about which said second flap pivots between said opened position and said closed position.

14. The carpet cover of claim 13, wherein said first flap is connected to said second flap and said first flap and said second flap are opened and closed together.

15. The carpet cover of claim 14, wherein said second layer of material includes a finger access opening adjacent said second flap opposite said second living hinge and said second flap includes an exposed edge at said finger access opening whereby said second flap may be engaged and said first flap and said second flap may be displaced into said opened position.

16. The carpet cover of claim 15, wherein said margin closes a bottom of said finger access opening.

17. The carpet cover of claim 16, wherein said first layer of material is an insulating material.

18. The carpet cover of claim 17, wherein said second layer of material is a carpet.

\* \* \* \* \*